July 11, 1939.  H. PELPHREY  2,165,761
ADJUSTABLE WORM ELEMENT
Filed March 15, 1937  2 Sheets-Sheet 1
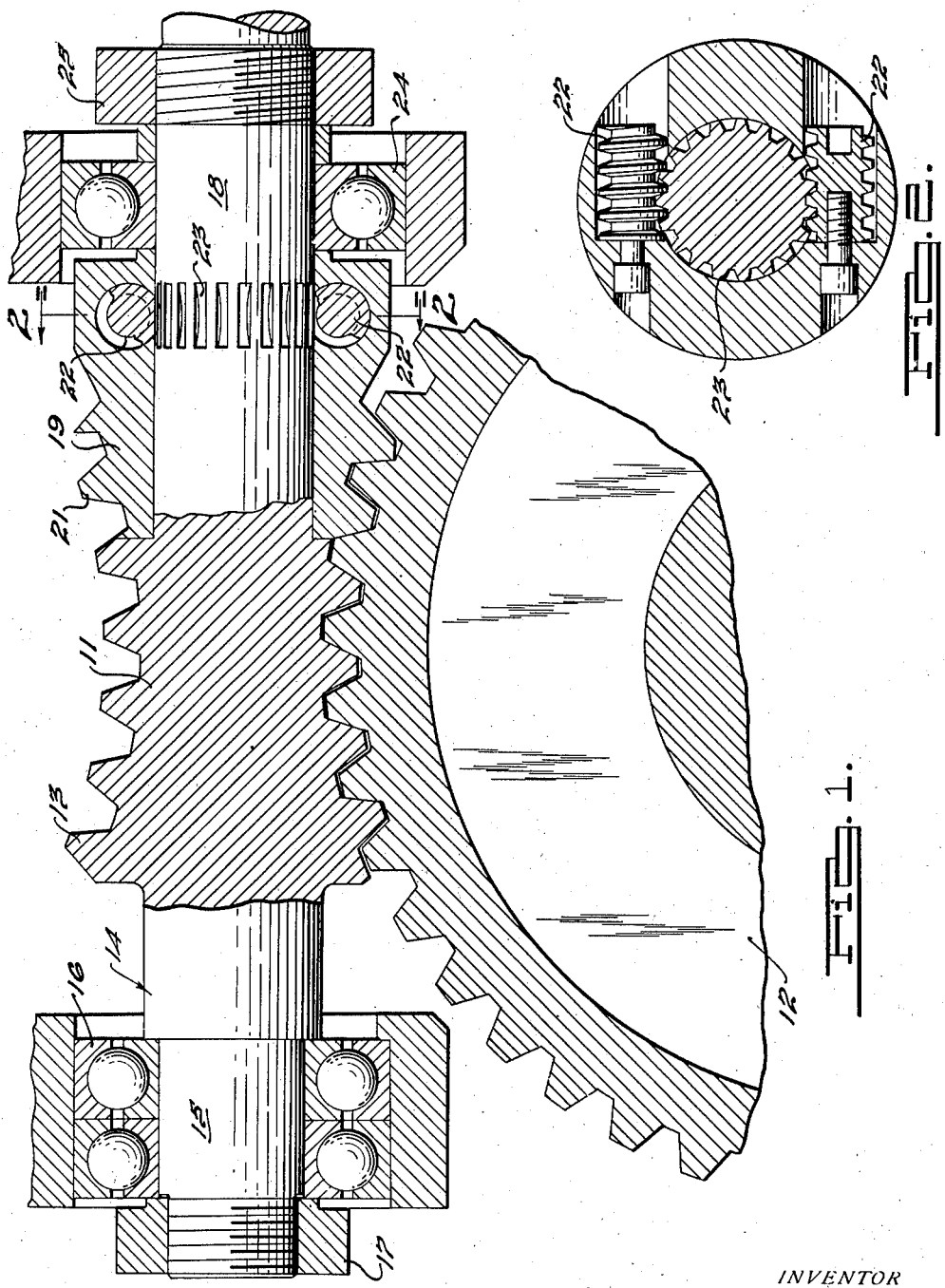
INVENTOR
Harry Pelphrey.
BY
Harness, Dickey & Pierce.
ATTORNEYS.

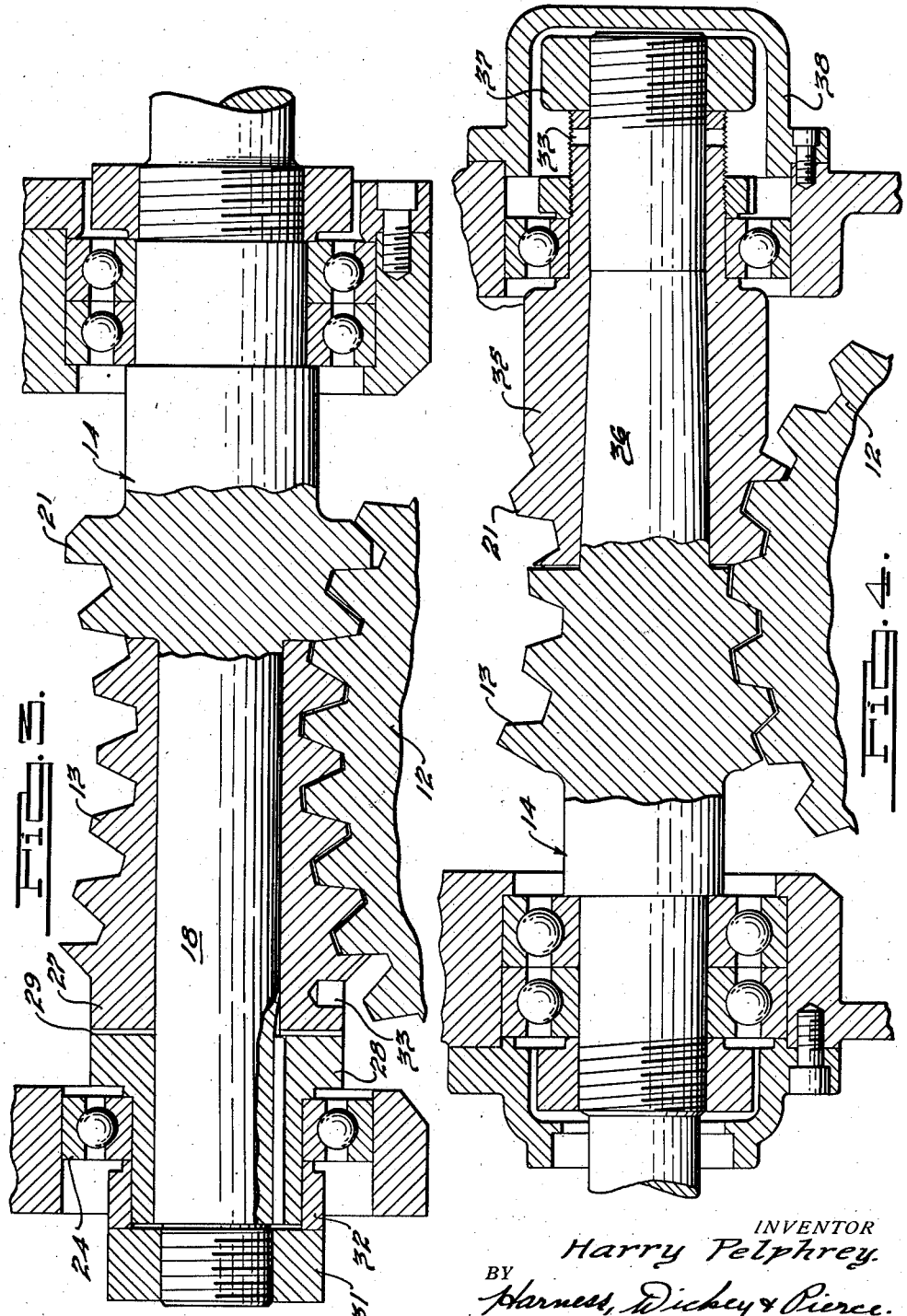

Patented July 11, 1939

2,165,761

UNITED STATES PATENT OFFICE 2,165,761

ADJUSTABLE WORM ELEMENT

Harry Pelphrey, Detroit, Mich.

Application March 15, 1937, Serial No. 130,906

5 Claims. (Cl. 74—440)

My invention relates to worms and particularly to a composite worm having portions of the thread adjustable relative to other portions thereof.

Worm gearing is often employed in devices that require all of the back lash, which usually is present in gear sets, to be entirely eliminated. It is substantially impossible to produce such gear sets commercially and also when so produced to have them remain free from back lash in the presence of wear which will occur between the thread of the worm and the teeth of the wheel.

In practicing my present invention, I fabricate the worm in such a manner as to have a portion of the thread or threads disposed on one part of the assembly and another portion of the thread or threads in an adjacent part. I provide means whereby one part of the thread or threads may be turned relative to the other and in this manner take up any back lash which may be present between the thread of the worm and the teeth of the gear. Various means may be employed for so fabricating the work. Preferably, a portion of the worm is constructed as part of a shaft and another portion as part of a sleeve which fits over the shaft and is retained fixed relative thereto.

Accordingly, the main objects of my invention are: to provide a worm having a portion of the thread adjustable relative to another portion thereof; to provide a portion of a worm as a unit part of a shaft and assemble a sleeve thereon having another portion of the threads machined therein; to provide a worm, having thread portions which are adjustable relative to each other, with means for adjusting the thread portions and retaining them in adjusted position; to provide a worm, having a threaded portion adjustable relative to another threaded portion thereof, with a worm drive connection by which the adjustment may be made and retained; to provide a worm, having a thread portion adjustable relative to another thread portion thereof, with means for releasing and securing the portions relative to each other to permit their adjustment; to provide a worm having thread portions adjustable relative to each other, which is simple in construction, positive in operation and economical of manufacture.

Other objects and features of novelty of my invention will be either specifically pointed out or will become apparent when referring, for a better understanding of my invention, to the following description taken in conjunction with the accompanying drawings, wherein:

Figure 1 is a broken view, partly in section and partly in elevation, of a worm and worm wheel assembly embodying features of my invention;

Fig. 2 is a sectional view of the structure illustrated in Fig. 1, taken on the line 2—2 thereof;

Fig. 3 is a view of structure, similar to that illustrated in Fig. 1, showing a modified form thereof, and Fig. 4 is a view of structure, similar to that illustrated in Fig. 1, showing a further form which my invention may assume.

In Figs. 1 and 2, I have illustrated a worm 11 and a worm wheel 12 mounted in meshed relation. The worm is preferably of the Hindley or enveloping type and is herein illustrated as being provided with a plurality of threads 13. A portion of the threads 13 is machined on a shaft 14, an end portion 15 of which is supported by bearings 16 which are retained on the shaft portion by a nut 17. A shaft portion 18, extending from the opposite end of the threaded section 13, supports a sleeve 19 containing thread portions 21 in continuation of the thread portions 13. The sleeve has a pair of worm elements 22 mounted therein which mesh with a plurality of teeth 23 cut into the shaft portion 18. A bearing 24 is also mounted on the shaft portion 18 and retained thereon by a nut 25. The worm elements 22 are employed to revolve the sleeve 19 relative to the shaft portion 18 and to retain the sleeve in adjusted position. Preferably the thread portions 13 and 21 are machined as a unit after assembly with tolerances held to a minimum so as to eliminate back lash or at least reduce it to a minimum.

Upon the assembly of worm 11 with the gear 12, any back lash which may be present between the threads of the worm and teeth of the gear can be eliminated through adjustment of the sleeve to rotate the thread portions 21 relative to the thread portions 13. The advancement of the lead of portions of the threads relative to other portions thereof results in the binding of opposite sides of the thread portions with the teeth of the gear. The adjustment is such as to employ that side of each thread portion that is substantially 90° to the axis of the worm. It will be noted that the right hand side of the thread at the left of the worm, as viewed in the figures, is at right angles to the worm axis and is disposed at an acute angle at the right of the worm, also that the left hand side of the thread at the left of the worm is an acute angle changing to a right angle to the worm axis at the right of the worm. By shifting the two thread portions as above described, the right angled thread portions at both ends of the worm are utilized providing a more desirable working relation. Full bearing is retained between all the threads of the worm and the teeth of the wheel which will entirely eliminate any back lash therebetween. When wear occurs between the teeth of the gear and the thread of the worm sufficient to produce back lash, adjustment may again be made between the worm portions to bring the threads into intimate engagement with the teeth and eliminate any play therebetween.

In Figure 3, I have shown a modified form which the assembled worm may assume. In this construction, the major portion of the threads 13 of the worm is mounted on a sleeve 27 while the remaining portion of the threads 21 is machined on a shaft 14. As far as the operation of the resulting structure is concerned, it makes no difference whether the longer length of the thread is disposed on the sleeve or machined directly on the shaft and each portion may be of equal length. In the present construction, a collar 28 is keyed to the shaft portion 18 and carries a bearing 24. The faces of the collar 28 and the sleeve 27 are serrated at 29 to form a lock between the collar and sleeve when the nut 31 is tightened against a bushing 32. A spanner wrench hole 33 is provided in the sleeve 27 to permit the turning of the sleeve on the shaft portion 18 when the collar 28 has been longitudinally moved sufficient to disengage the serrations 29. After sufficient adjustment has been made, the tightening of the nut 17 will lock the assembly and prevent rotation of the sleeve 27 relative to the shaft 14.

A further form which my invention may assume is illustrated in Fig. 4. In this construction, a sleeve portion 35 has the inner surface thereof tapered to engage a tapered shaft portion 36 on the end of the shaft 14. Thread portions 13 and 21 are provided on the shaft 14 and sleeve 35, respectively. A nut 37, on the end of the shaft portion 36, wedges the sleeve 35 thereon after it has been adjusted in rotation preferably by a spanner wrench engaging the spanner holes 33. A cap 38 is mounted over the end of the shaft portion 36 to enclose the end of the shaft against the entrance of dirt and grit and to prevent lubricant from leaking. When adjustment is desired between the threaded portions 13 and 21, the cap 38 is removed, the nut 37 backed off, and a puller nut (not shown) is secured to the threads on the end of the sleeve 35 and tightened against the end of the shaft 36 to loosen the sleeve in a well known manner. A spanner wrench may be employed to adjust the sleeve in rotation where it will be retained through the tightening of the nut 37.

The worm, fabricated and adjusted in this manner, provides surface contact between opposite sides of portions of the worm thread and the worm gear teeth and entirely eliminates any back lash between the gear assembly. In view of the surface contact obtained simultaneously in this manner between all of the threads of the worm, very little wear will occur between the threads and teeth and very little adjustment will therefore be required. If, however, sufficient wear does occur to produce back lash, adjustment can be readily made to completely eliminate it from the gear set.

While I have described and illustrated several embodiments of my invention, it will be apparent to those skilled in the art that various changes, omissions, additions and substitutions may be made therein without departing from the spirit and scope of my invention, as set forth in the accompanying claims.

What is claimed is:

1. A worm for worm gearing of the Hindley type including a shaft having a portion of the thread of said worm integrally formed thereon, a collar on said shaft having a remaining portion of the thread of said worm formed thereon, a series of threads in the periphery of said shaft interiorly of said collar, an adjusting worm journalled for rotation in said collar adapted to mesh with the threads in the peripheral surface of said shaft whereby rotation of said adjusting worm will effect a rotation of said collar with respect to said shaft while retaining said collar in predetermined axial position thereon, and means for locking said adjusting worm against rotation to lock said collar in predetermined position with respect to said shaft.

2. A worm for worm gearing of the Hindley type including in combination a shaft having a portion of the thread of said worm integrally formed thereon, a collar on said shaft rotatably mounted with respect thereto and having the remaining portion of the thread of said worm formed thereon, said collar having a serrated axial end face, a locking collar splined on said shaft axially movable with respect thereto and having a serrated axial face adapted to engage the axial face of said first mentioned collar to lock the same in predetermined position.

3. A worm for worm gearing of the Hindley type including in combination a shaft having a portion of the thread of said worm integrally formed thereon, a collar on said shaft rotatably mounted with respect thereto and having the remaining portion of the thread of said worm formed thereon, the portion of said shaft receiving said collar being tapering and the interior of said collar being complementary tapering whereby when said collar is moved axially, the same will automatically be locked against rotation with respect to said shaft and means adapted to engage one axial end of said collar to retain the same in locked position to preclude relative rotation between said collar and said shaft.

4. A worm for worm gearing including a shaft having a portion of the thread of said worm integrally formed thereon, a collar on said shaft having the remaining portion of the thread of said worm formed thereon, threads on the exterior surface of said shaft, means adapted to engage said last mentioned threads serving to lock said collar in predetermined circumferential position with respect to said shaft.

5. A worm for worm gearing including a shaft having a portion of the thread of said worm integrally formed thereon, a collar on said shaft having the remaining portion of the thread of said worm formed thereon, threads on the exterior surface of said shaft, a threaded member having threads adapted to engage the threads on said shaft, said member serving to engage said collar and serving to interlock said collar with respect to said shaft and to retain said collar in predetermined adjusted position.

HARRY PELPHREY.